(12) United States Patent
Suyama

(10) Patent No.: US 8,283,878 B2
(45) Date of Patent: Oct. 9, 2012

(54) BATTERY STORAGE DEVICE SYSTEM, AND MOTOR DRIVING BODY AND MOVING BODY USING THE SYSTEM

(75) Inventor: Hiroshi Suyama, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 332 days.

(21) Appl. No.: 12/673,940

(22) PCT Filed: Feb. 16, 2009

(86) PCT No.: PCT/JP2009/052561
§ 371 (c)(1),
(2), (4) Date: Apr. 28, 2010

(87) PCT Pub. No.: WO2010/092692
PCT Pub. Date: Aug. 19, 2010

(65) Prior Publication Data
US 2011/0037420 A1    Feb. 17, 2011

(51) Int. Cl.
*H02P 7/00* (2006.01)
*H02J 7/14* (2006.01)
*H01M 10/50* (2006.01)

(52) U.S. Cl. ........ 318/139; 318/254; 318/140; 320/137; 320/150; 320/152; 307/9.1

(58) Field of Classification Search .................. 318/139, 318/254, 140–150; 307/9.1; 320/137, 150, 320/152
See application file for complete search history.

(56) References Cited

U.S. PATENT DOCUMENTS

| | | | | |
|---|---|---|---|---|
| 7,583,050 | B2 * | 9/2009 | Sugiura et al. | 320/104 |
| 7,888,811 | B2 * | 2/2011 | Ichikawa et al. | 307/9.1 |
| 7,911,077 | B2 * | 3/2011 | Ichikawa et al. | 307/9.1 |
| 8,148,951 | B2 * | 4/2012 | Saito | 320/155 |

(Continued)

FOREIGN PATENT DOCUMENTS

JP    A 47-31320    11/1972

(Continued)

OTHER PUBLICATIONS

International Search Report issued in corresponding International Application No. PCT/JP2009/052561, mailed May 12, 2009 (with translation).

(Continued)

*Primary Examiner* — Paul Ip
(74) *Attorney, Agent, or Firm* — Oliff & Berridge, PLC

(57) ABSTRACT

The invention provides a high-efficiency battery storage device system, and a motor driving body and a moving body using the system. The battery storage device system comprises (1) a main battery storage device A having high energy density relative to an auxiliary battery storage device B, (2) the auxiliary battery storage device B having high output density relative to the main battery storage device A, (3) a warm-up means for warming up the main battery storage device A to a predetermined temperature or more, (4) a warm-up monitoring means for monitoring a need for warm-up with respect to the main battery storage device A, (5) an operation mode switching means for selecting an operation mode from a warm-up operation mode and a normal operation mode and performing the selected operation mode, and (6) an electricity supply system supplying an electric power to an outside of the battery storage device system.

16 Claims, 3 Drawing Sheets

U.S. PATENT DOCUMENTS

| | | | |
|---|---|---|---|
| 2004/0056633 A1* | 3/2004 | Sugiura et al. | 320/101 |
| 2006/0022646 A1* | 2/2006 | Moore et al. | 320/150 |
| 2006/0238165 A1* | 10/2006 | Moore et al. | 320/118 |
| 2009/0315396 A1* | 12/2009 | Ichikawa et al. | 307/24 |
| 2009/0315403 A1* | 12/2009 | Ichikawa et al. | 307/82 |
| 2010/0097036 A1* | 4/2010 | Wakayama | 320/153 |
| 2010/0164438 A1* | 7/2010 | Saito | 320/152 |
| 2010/0250038 A1* | 9/2010 | Morita et al. | 701/22 |
| 2011/0018491 A1* | 1/2011 | Yoshida et al. | 320/101 |

FOREIGN PATENT DOCUMENTS

| | | |
|---|---|---|
| JP | A 47-31321 | 11/1972 |
| JP | A 52-78036 | 7/1977 |
| JP | A-59-073851 | 4/1984 |
| JP | A 8-148189 | 6/1996 |
| JP | A 11-176487 | 7/1999 |
| JP | A 2000-295784 | 10/2000 |
| JP | A 2000-303836 | 10/2000 |
| JP | A 2000-357545 | 12/2000 |
| JP | A 2002-095182 | 3/2002 |
| JP | A-2002-203593 | 7/2002 |
| JP | A 2003-086254 | 3/2003 |
| JP | A 2003-282154 | 10/2003 |
| JP | A-2004-039523 | 2/2004 |
| JP | A 2004-047133 | 2/2004 |
| JP | A 2004-215456 | 7/2004 |
| JP | A 2005-248744 | 9/2005 |
| JP | A 2005-318675 | 11/2005 |
| JP | A-2006-120334 | 5/2006 |
| JP | A 2008-029071 | 2/2008 |
| JP | A-2008-135379 | 6/2008 |
| JP | A-2008-226639 | 9/2008 |
| JP | A-2008-288037 | 11/2008 |

OTHER PUBLICATIONS

Japanese Office Action issued May 1, 2012 in Japanese Application No. 2009-552966.

* cited by examiner

BATTERY STORAGE DEVICE SYSTEM, AND MOTOR DRIVING BODY AND MOVING BODY USING THE SYSTEM

TECHNICAL FIELD

The present invention relates to a high-efficiency battery storage device system, and a motor driving body and a moving body using the system.

BACKGROUND ART

A difference in electric load between day and night or among seasons is a large problem for an electricity supply system, and recently the difference in electric load increases more and more. On the other hand, in order to improve industrial competitiveness and the like, a demand for reducing electricity cost increases, and a load leveling applied to the electricity supply becomes a considerably large issue. A highly efficient with large-capacity electricity supply system is being developed and put into practical use as one of countermeasures against the issue.

In order to solve the problem with the decrease of the electricity cost, for example, Patent Document 1 discloses a technique relating to a hybrid battery system in which a sodium-sulfur battery having high energy capacity and a high-output type battery having a high output/energy ratio relative to the sodium-sulfur battery are connected in parallel with respect to an electricity system.

Patent Document 1: Japanese Patent Publication Laid-Open No. 2004-215456

SUMMARY OF INVENTION

Technical Problem

Because the hybrid battery system disclosed in Patent Document 1 is limited to a combination of the sodium-sulfur battery and the battery having the high output/energy ratio relative to the sodium-sulfur battery, that is, the small energy capacity, a battery storage device having energy capacity larger than that of the sodium-sulfur battery cannot be used, and therefore there is a limitation to electric energy that can be supplied at a time.

An object of the invention is to provide a high-efficiency battery storage device system, and a motor driving body and a moving body using the system.

Solution to Problem

A battery storage device system of the present invention is a battery storage device system that has a main battery storage device A and an auxiliary battery storage device B as power source, comprising:

(1) the main battery storage device A that has high energy density relative to the auxiliary battery storage device B, the main battery storage device A having an output ability that is equal to or more than an output requirement necessary for the battery storage device system by a single output of the main battery storage device A in a temperature range of a predetermined temperature or more, and the output ability of the main battery storage device A being below the output requirement in a temperature range lower than the predetermined temperature;

(2) the auxiliary battery storage device B that has high output density relative to the main battery storage device A, the auxiliary battery storage device B having the output ability that is equal to or more than the output requirement by a single output of the auxiliary battery storage device B or simultaneous outputs of the main battery storage device A and the auxiliary battery storage device B in the temperature range lower than the predetermined temperature;

(3) a warm-up means for warming up the main battery storage device A to the predetermined temperature or more;

(4) a warm-up monitoring means for monitoring a need for warm-up with respect to the main battery storage device A;

(5) an operation mode switching means for selecting an operation mode from a warm-up operation mode and a normal operation mode and performing the selected operation mode, wherein the warm-up operation mode starts warm-up of the main battery storage device A and the single output of the auxiliary battery storage device B or the simultaneous outputs of the main battery storage device A and the auxiliary battery storage device B are performed while the warm-up being performed when the warm-up monitoring means determines that the warm-up of the main battery storage device A is required, and the normal operation mode stops the warm-up of the main battery storage device A and the single output of the main battery storage device A is performed when the warm-up monitoring means determines that the warm-up of the main battery storage device A is not required; and (6) an electricity supply system for supplying an electric power to an outside of the battery storage device system, the electric power being obtained by the single output of the auxiliary battery storage device B or the simultaneous outputs of the main battery storage device A and the auxiliary battery storage device B in the warm-up operation mode, or obtained by the single output of the main battery storage device A in the normal operation mode.

In the battery storage device system having the above-described configuration, the use of the combination of the main battery storage device A specializing in the high energy density and the auxiliary battery storage device B specializing in the high output density can obtain the stable, high output in the wide temperature range compared with the conventional case in which a problem with output shortage is generated when a battery storage device is singularly incorporated in the system, in particular, at the time when the battery storage device system is started.

In the battery storage device system according to the present invention, preferably the warm-up means is a heat exchange means for performing heat exchange between the main battery storage device A and the auxiliary battery storage device B.

The battery storage device system having the above-described configuration includes the heat exchange means that can perform the heat exchange between the main battery storage device A and the auxiliary battery storage device B, so that exhaust heat generated by the operation of the main battery storage device A and/or the operation of the auxiliary battery storage device B can be utilized to raise a temperature at the main battery storage device A when the operation mode switching means selects and performs the warm-up operation mode. Accordingly, a heatup time of the main battery storage device A can be shortened while the single output of the auxiliary battery storage device B or the simultaneous outputs of the main battery storage device A and the auxiliary battery storage device B are performed.

In one embodiment of the battery storage device system according to the present invention, the warm-up monitoring means includes a temperature measuring device that monitors a temperature at the main battery storage device A and data of operation mode switching temperature that is set to the temperature range of the predetermined temperature or more as temperature data, the temperature data becoming a criterion for determining the need for warm-up, and the warm-up monitoring means determines that the warm-up of the main battery storage device A is required when the temperature at the main battery storage device A is lower than the operation mode switching temperature.

In the battery storage device system having the above-described configuration, the warm-up monitoring means has the data of operation mode switching temperature, so that the determination whether the warm-up of the main battery storage device A is required can be made from the temperature at the main battery storage device A monitored by the temperature measuring device.

In one embodiment of the battery storage device system according to the present invention, the warm-up monitoring means includes a output measuring device that monitors an output at the main battery storage device A and predetermined data of operation mode switching output that is seemed to reach the temperature range of the predetermined temperature or more as output data, the output data becoming a criterion for determining the need for warm-up, and the warm-up monitoring means determines that the warm-up of the main battery storage device A is required when the output of the main battery storage device A is lower than the operation mode switching output.

In the battery storage device system having the above-described configuration, the warm-up monitoring means has, for example, the data of operation mode switching output derived from a temperature-output curve of the main battery storage device A, so that the determination whether the warm-up of the main battery storage device A is required can be made from the output at the main battery storage device A monitored by the output measuring device.

In the battery storage device system according to the present invention, preferably the warm-up monitoring means is activated in at least a starting stage of the battery storage device system.

In the battery storage device system having the above-described configuration, whether, the warm-up of the main battery device A is required is monitored from the starting stage of the battery storage device system, and the warm-up of the main battery storage device A can be started when needed.

In one embodiment of the battery storage device system according to the present invention, the operation mode switching means has only one warm-up operation mode in which the single output of the auxiliary battery storage device B is performed while the warm-up being performed, and the operation mode switching means stops the warm-up of the main battery storage device A and switches the single output of the auxiliary battery storage device B to the single output of the main battery storage device A when the warm-up monitoring means determines that the warm-up of the main battery storage device A is not required.

In one embodiment of the battery storage device system according to the present invention, the warm-up monitoring means further monitors progress of the warm-up when determining that the warm-up of the main battery storage device A is required, the operation mode switching means has at least two warm-up operation modes, the warm-up operation modes differing from each other in an activating state of the main battery storage device A and/or the auxiliary battery storage device B, and the operation mode switching means selects an optimum warm-up operation mode according to the progress of the warm-up, the progress of the warm-up being determined by the warm-up monitoring means.

The battery storage device system having the above-described configuration has at least two warm-up operation modes that differ from each other in the activating state of the main battery storage device A and/or the auxiliary battery storage device B, so that the activating state of the main battery storage device A and/or the auxiliary battery storage device B can be adjusted in a stepwise manner according to the progress of the warm-up.

In the battery storage device system according to the present invention, the main battery storage device A is preferably a solid electrolyte secondary battery.

In the battery storage device system having the above-described configuration, the secondary battery including the solid electrolyte having a longer life and higher safety compared with the battery including the liquid electrolyte, in particular the battery including the organic liquid as the electrolyte is used as the main battery storage device A, so that the high-safety electricity supply can be realized for a long time. In the battery storage device system having the above-described configuration, the secondary battery including the solid electrolyte having the high energy density per capacity is used as the main battery storage device A, so that a volume of the battery storage device system can be reduced as a whole.

In one embodiment of the battery storage device system according to the present invention, the auxiliary battery storage device B may be a solid electrolyte secondary battery.

In one embodiment of the battery storage device system according to the present invention, the auxiliary battery storage device B may be a lithium-ion secondary battery.

In the battery storage device system having the above-described configuration, the lithium-ion secondary battery including the liquid electrolyte that can exert the high output even in a low temperature is used as the auxiliary battery storage device B, so that particularly the high output can be obtained when starting the system.

Preferably, the battery storage device system according to the present invention further comprises charging means for charging the main battery storage device A and the auxiliary battery storage device B.

The battery storage device system having the above-described configuration includes the charging means, so that the system can withstand the longer use.

A motor driving body of the invention includes the battery storage device system described above and a motor that is driven by an electric power supplied from the battery storage device system, wherein the warm-up means of the battery storage device system is a heat exchange means for performing heat exchange between the main battery storage device A and the motor.

The motor driving body having the above-described configuration includes the heat exchange means that can perform the heat exchange between the main battery storage device A and the motor, so that the exhaust heat generated by the operation of the main battery storage device A and/or the operation of the motor can be utilized to raise the temperature at the main battery storage device A when the operation mode switching means selects and performs the warm-up operation mode. Accordingly, the heatup time of the main battery storage device A can be shortened while the single output of the auxiliary battery storage device B or the simultaneous outputs of the main battery storage device A and the auxiliary battery storage device B are performed.

Preferably, the motor driving body according to the present invention further comprises charging means for charging the main battery storage device A and the auxiliary battery storage device B, wherein a charging source of the charging means is the motor.

The motor driving body having the above-described configuration includes the charging means of the motor, so that the system can withstand the longer use. In the motor driving body having the above-described configuration, the motor drive and the charging are simultaneously performed by the motor, so that energy saving can be realized.

A moving body of the invention comprises the battery storage device system described above and a motor that is driven by an electric power supplied from the battery storage device system, wherein the warm-up means of the battery storage device system is a heat exchange means for performing heat exchange between the main battery storage device A and the motor.

The moving body having the above-described configuration includes the heat exchange means that can perform the heat exchange between the main battery storage device A and the motor, so that the exhaust heat generated by the operation of the main battery storage device A and/or the operation of the motor can be utilized to raise the temperature at the main battery storage device A when the operation mode switching means selects and performs the warm-up operation mode. Accordingly, the heatup time of the main battery storage device A can be shortened while the single output of the auxiliary battery storage device B or the simultaneous outputs of the main battery storage device A and the auxiliary battery storage device B are performed.

In the moving body according to the present invention, preferably, the warm-up monitoring means of the battery storage device system includes a temperature measuring device that monitors a temperature at the main battery storage device A and data of operation mode switching temperature that is set to a temperature range exceeding a temperature range of ambient temperature to which the moving body is probably subject as temperature data, the temperature data becoming a criterion for determining a need for warm-up, and the warm-up monitoring means determines that the warm-up of the main battery storage device A is required when the temperature at the main battery storage device A is lower than the operation mode switching temperature.

In the moving body having the above-described configuration, the warm-up monitoring means has the data of operation mode switching temperature that is set to the temperature range exceeding the temperature range of the ambient temperature to which the moving body is probably subject, so that the determination whether the warm-up of the main battery storage device A is required can be made from the temperature at the main battery storage device A monitored by the temperature measuring device.

Preferably, the moving body according to the present invention further comprises charging means for charging the main battery storage device A and the auxiliary battery storage device B, wherein a charging source of the charging means is the motor.

The moving body having the above-described configuration includes the charging means of the motor, so that the system can withstand the longer use. In the moving body having the above-described configuration, the motor drive and the charging are simultaneously performed by the motor, so that the energy saving can be realized.

Advantageous Effect of Invention

According to the invention, the use of the combination of the main battery storage device A specializing in the high energy density and the auxiliary battery storage device B specializing in the high output density can obtain the stable, high output in the wide temperature range compared with the conventional case in which the problem with the output shortage is generated when the battery storage device is singularly incorporated in the system, in particular, when the battery storage device system is started.

DESCRIPTION OF EMBODIMENTS

Figure 1:
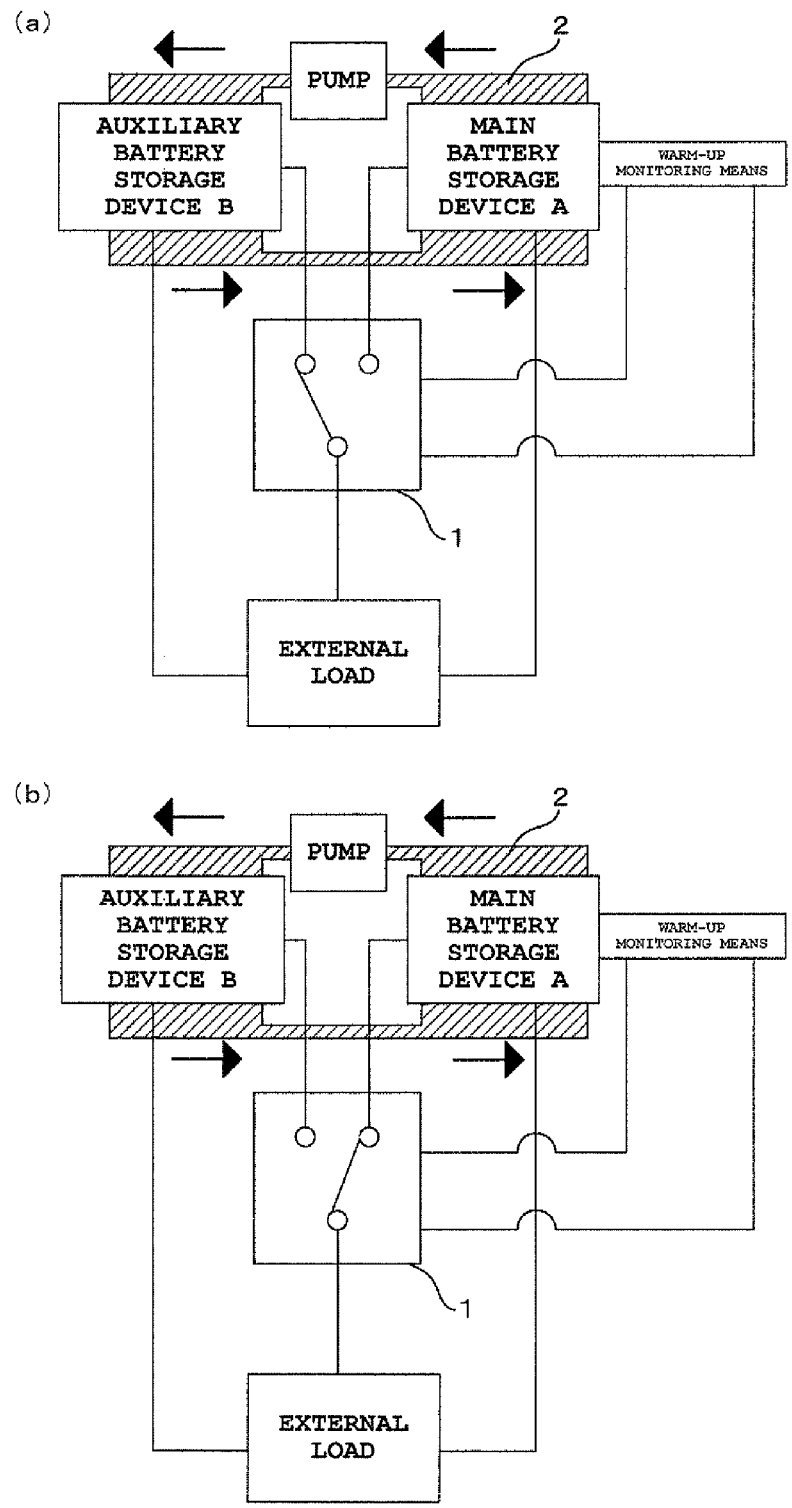
FIG. 1 is a schematic diagram illustrating a typical example of a state in which a battery storage device system according to an embodiment of the invention is connected to an external load.

A battery storage device system according to an embodiment of the invention that has a main battery storage device A and an auxiliary battery storage device B as power source, comprises:

(1) the main battery storage device A that has high energy density relative to the auxiliary battery storage device B, the main battery storage device A having an output ability that is equal to or more than an output requirement necessary for the battery storage device system by a single output of the main battery storage device A in a temperature range of a predetermined temperature or more, and the output ability of the main battery storage device A being below the output requirement in a temperature range lower than the predetermined temperature;

(2) the auxiliary battery storage device B that has high output density relative to the main battery storage device A, the auxiliary battery storage device B having the output ability that is equal to or more than the output requirement by a single output of the auxiliary battery storage device B or simultaneous outputs of the main battery storage device A and the auxiliary battery storage device B in the temperature range lower than the predetermined temperature;

(3) a warm-up means for warming up the main battery storage device A to the predetermined temperature or more;

(4) a warm-up monitoring means for monitoring a need for warm-up with respect to the main battery storage device A;

(5) an operation mode switching means for selecting an operation mode from a warm-up operation mode and a normal operation mode and performing the selected operation mode, wherein the warm-up operation mode starts warm-up of the main battery storage device A and the single output of the auxiliary battery storage device B or the simultaneous outputs of the main battery storage device A and the auxiliary battery storage device B are performed while the warm-up being performed when the warm-up monitoring means determines that the warm-up of the main battery storage device A is required, and the normal operation mode stops the warm-up of the main battery storage device A and the single output of the main battery storage device A is performed when the warm-up monitoring means determines that the warm-up of the main battery storage device A is not required; and (6) an electricity supply system for supplying an electric power to an outside of the battery storage device system, the electric power being obtained by the single output of the auxiliary battery storage device B or the simultaneous outputs of the main battery storage device A and the auxiliary battery storage device B in the warm-up operation mode, or obtained by the single output of the main battery storage device A in the normal operation mode.

The battery storage device system of the embodiment includes at least six components, that is, (1) the main battery storage device A, (2) the auxiliary battery storage device B, (3) the warm-up means, (4) the warm-up monitoring means, (5) the operation mode switching means, and (6) the electricity supply system. The components will be described in order.

(1) Main Battery Storage Device A and (2) Auxiliary Battery Storage Device B

One of features of the battery storage device system of the embodiment is that the main battery storage device A specializing in the high energy density and the auxiliary battery storage device B specializing in the high output density are used while combined. In the battery storage device system of the embodiment, the "battery storage device" means a device in which an electric power can be stored in order to supply the electric power to an external load.

The high-energy-density battery storage device means a battery storage device having high energy density, specifically means a battery storage device having a characteristic suitable to the relatively long electricity supply. As used herein, either weight energy density (unit: Wh/kg) or volume energy density (unit: Wh/L or Wh/m$^3$) can be adopted as the energy density.

On the other hand, the high-output-density battery storage device means a battery storage device having high output density (unit: W/kg), specifically means a battery storage device having a characteristic suitable to supply the high electric power in a relatively short period of time.

Usually, in the single battery storage device, there is a trade-off relationship between exhibition of the high output density and the achievement of the high energy density. Accordingly, it is difficult to prepare the battery storage device that can satisfy conditions of both the high output density and the high energy density in particularly low temperatures.

In the battery storage device system, such as the battery mounted on an electric automobile, which is mainly used outside the room, it is necessary to start the system with the high output density and high energy density even in low temperatures. However, due to the trade-off relationship, conventionally it is difficult to prepare the battery storage device system that can deal with the purpose.

In order to break the current condition, the inventors develop the battery storage device system that can obtain the stable, high output in a wide temperature range compared with the conventional case in which the problem with the output shortage when the battery storage device is singularly incorporated in the system and, in particular, at the time of system start, by the use of the combination of the main battery storage device A specializing in the high energy density and the auxiliary battery storage device B specializing in the high output density.

The main battery storage device A used in the battery storage device system of the embodiment has the high energy density relative to auxiliary battery storage device B, the main battery storage device A has output ability that is equal to or more than an output requirement required for the battery storage device system by the single output of the main battery storage device A in a temperature range of a predetermined temperature or more, and the main battery storage device A does not reach the output requirement in a temperature range lower than the predetermined temperature (hereinafter the predetermined temperature is occasionally referred to as "output ability exhibition minimum temperature at the main battery storage device A"). Accordingly, in order to activate the battery storage device system by the single output of the main battery storage device A, it is necessary that the warm-up means warms up the main battery storage device A to the output ability exhibition minimum temperature at the main battery storage device A or more.

The auxiliary battery storage device B used in the battery storage device system of the embodiment has the high output density relative to the main battery storage device A, and the auxiliary battery storage device B has the output ability that is equal to or more than the output requirement by the single output of the auxiliary battery storage device B or the simultaneous outputs of the main battery storage device A and auxiliary battery storage device B in a temperature range lower than the output ability exhibition minimum temperature at the main battery storage device A. Accordingly, in a stage prior to the activation of the battery storage device system by the single output of the main battery storage device A, the activation of the battery storage device system by the single output of the auxiliary battery storage device B or the activation of the battery storage device system by the simultaneous outputs of the main battery storage device A and auxiliary battery storage device B can be selected.

In the battery storage device system of the embodiment, a battery, a secondary battery, and a capacitor can be cited as an example of the battery storage device.

The battery (primary battery) is a device that converts a decrease in chemical energy associated with a chemical reaction into the electric energy. Specifically examples of the battery include, but are not limited to, a manganese dry battery, an alkaline manganese dry battery, a nickel primary battery, a nickel manganese battery, a silver oxide battery, a mercury battery, a zinc air battery, a lithium battery, and a seawater battery.

The secondary battery is a device in which the chemical energy can be converted into the electric energy can be performed like the primary battery while the electric energy can be converted into the chemical energy to store (charge) the energy by passing a current in an opposite direction to that of discharging. Specifically examples of the battery include, but are not limited to, a lead storage battery, a nickel-cadmium secondary battery, a silver oxide-zinc secondary battery, a nickel-zinc secondary battery, a nickel-metal hydride battery, a lithium-ion secondary battery, a lithium-iron sulfide secondary battery, a sodium-sulfur battery, a redox flow secondary battery, and a zinc-bromine secondary battery.

The capacitor is a device that stores or emits charges (electric energy) by electrostatic capacity. Specifically examples of the battery include, but are not limited to, a plastic film capacitor, a ceramic capacitor, a mica capacitor, an electrolytic capacitor, an electric double layer capacitor, a variable capacitor, a paper capacitor, an oil capacitor, a vacuum capacitor, and a gas-filled capacitor.

The battery storage device is roughly classified into an exothermic battery storage device and an endothermic battery storage device. In the exothermic battery storage device, an energy loss is generated as heat when the decrease in physical energy based on a physical law or the decrease in chemical energy associate with the chemical reaction is converted into the electric energy. In the endothermic battery storage device, as contrasted to the exothermic battery storage device, the physical energy based on a physical law or the chemical energy associate with the chemical reaction increases by taking thermal energy from the surrounding environment, thereby generating the electric energy.

In the battery storage device system of the embodiment, preferably the exothermic battery storage device is used as at least the auxiliary battery storage device B, and particularly preferably the exothermic battery storage device is used as both the main battery storage device A and the auxiliary battery storage device B.

The plural batteries, the plural secondary batteries, the plural capacitors, and the like (hereinafter sometimes referred to as batteries and the like), which are appropriately connected in series or in parallel, can be used as the battery storage device of the embodiment. In such cases, the same kind of batteries collected or different kinds of batteries collected may be used as the battery storage device.

Preferably, the main battery storage device A is a device in which the output gradually increases as time goes by from the starting of the system. Particularly, in the main battery storage device A, preferably the output increases according to the temperature, that is, the output in the temperature range of the output ability exhibition minimum temperature at the main battery storage device A after a given time elapses from the starting of the system is higher than the output at the temperature in starting the system.

When the exothermic battery storage device is used as the auxiliary battery storage device B, in the main battery storage device A, preferably the output increases by the exhaust heat of the auxiliary battery storage device B. When the exothermic battery storage device is used as both the main battery storage device A and the auxiliary battery storage device B, in the main battery storage device A, preferably the output increases by the exhaust heat of the main battery storage device A and/or the exhaust heat of the auxiliary battery storage device B.

A method for utilizing the exhaust heat of the auxiliary battery storage device B for the increase in output of the main battery storage device A is described later.

In the battery storage device system of the embodiment, preferably the main battery storage device A is a solid electrolyte secondary battery.

The solid electrolyte that is of a kind of the electrolyte used in the secondary battery generally has a behavior in which ion conductivity is enhanced with rising temperature. That is, in the secondary battery having the solid electrolyte, the output of the battery is enhanced with rising temperature. When the secondary battery having the solid electrolyte is used in high temperatures, advantageously the output of the battery is enhanced without enlarging an opposed area of the battery or thinning an active material layer of a positive electrode and/or a negative electrode. Conventionally, in the secondary battery having the solid electrolyte, disadvantageously the volume of the entire system becomes bulky when the opposed area of the battery is enlarged in order to enhance the output in low temperatures, or disadvantageously the output is enhanced while the energy density is lowered when the active material layer is thinned.

The secondary battery having the solid electrolyte has longer life and higher safety compared with the battery having the liquid electrolyte, in particular, the organic liquid electrolyte. In the secondary battery having the organic liquid electrolyte, it is known that degradation of the electrolyte is advanced to shorten the life of the entire battery when the temperature is raised to enhance the output. It is also known that the secondary battery having the organic liquid electrolyte always carries a risk of firing of the organic liquid.

Accordingly, in the preferable mode of the battery storage device system of the embodiment in which the secondary battery having the solid electrolyte is used as the main battery storage device A, the secondary battery including the solid electrolyte having longer life and higher safety compared with the battery having the liquid electrolyte, in particular the organic liquid electrolyte, is used as the main battery storage device A, which allows the high-safety electricity supply to be realized in a long period of time. In the preferable mode of the battery storage device system of the embodiment, the secondary battery including the solid electrolyte having the high energy density per capacity is used as the main battery storage device A, which allows the volume to be reduced in the entire battery storage device system.

In one embodiment of the battery storage device system of the embodiment, the auxiliary battery storage device B may be a solid electrolyte secondary battery.

A solid oxide electrolyte and a solid sulfide electrolyte can be used as the solid electrolyte.

Specifically, LiPON (lithium phosphate oxynitride), $Li_{1.3}Al_{0.3}Ti_{0.7}(PO_4)_3$, and $La_{0.51}Li_{0.34}TiO_{0.74}$ can be cited as an example of the solid oxide electrolyte.

Specifically, $Li_2S$—$P_2S_5$, $Li_2S$—$SiS_2$, and $Li_{3.25}P_{0.25}Ge_{0.76}S_4$ can be cited as an example of the solid sulfide electrolyte.

In the battery storage device system of the embodiment, preferably the main battery storage device A is a total solid secondary battery having the solid electrolyte.

In one embodiment of the battery storage device system of the invention, the auxiliary battery storage device B may be a lithium-ion secondary battery. This is because the high output can be obtained particularly in starting the system by the use of the lithium-ion secondary battery having the liquid electrolyte that can exhibits the high output even in low temperatures as the auxiliary battery storage device B.

As to the specific configuration of the lithium-ion secondary battery having the liquid electrolyte, carbon is used as the negative electrode, lithium transition metal oxide such as lithium cobaltate is used as the positive electrode, and a material in which lithium salt such as lithium hexafluorophosphate ($LiPF_6$) is added to an organic solvent such as ethylene carbonate and diethyl carbonate is used as the electrolyte. However, for the materials for the negative electrode, positive electrode, and the electrolyte, the materials having various configurations can be used because generally the charging and discharging can be performed by receiving and emitting the charge while the lithium ion is moved.

Examples of the lithium salt include fluorine-based complex salt such as $LiBF_4$ and salt such as $LiN(SO_2Rf)_2 \cdot LiC(SO_2Rf)_3$ (where $Rf=CF_3$ and $C_2F_5$) in addition to $LiPF_6$.

In order to impart the high electric conductivity and safety to the electrolytic solution, lower chain ester carbonate, such as dimethyl carbonate, ethyl methyl carbonate, and diethyl carbonate, which is of low-viscosity solvent, is used with cyclic ester carbonate solvent, such as ethylene carbonate and propylene carbonate, which has the high permittivity and high boiling point, and lower fatty acid ester is partially used.

Preferably, the battery storage device system of the embodiment further includes charging means for charging the main battery storage device A and the auxiliary battery storage device B from the viewpoint of endurance of long-term use.

There is no particular limitation to the charging means. A device that is generally used to charge the battery storage device and a method for charging the battery storage device can be adopted. When the secondary battery is used as the battery storage device, specifically charging methods such as constant voltage charging, constant current charging, constant current-constant voltage charging (CC-CV), $-\Delta v$ detection charging, battery temperature rising detection charging, battery temperature rising derivative value detection charging, charging current addition-stop (measurement) charging, pulse charging, and trickle charging can appropriately be selected according to the kind of the battery. When the capacitor is used as the battery storage device, specifically the charging can be performed by applying a voltage between electrodes.

The main battery storage device A and auxiliary battery storage device B are not limited to only one of the 0%-output state and the 100%-output state in the electricity supply. That is, in the main battery storage device A and auxiliary battery storage device B, the output state may variably be adjusted between 0% and 100%.

(3) Warm-Up Means

The warm-up means included in the battery storage device system of the embodiment is means for warming up the main battery storage device A to the output ability exhibition minimum temperature at the main battery storage device A or more.

As used herein, "the warm-up of the main battery storage device A" means that the temperature at the main battery storage device A is raised such that the main battery storage device A reaches the required output of the system by the single output. At this point, "the temperature at the main battery storage device A" means a temperature in a surrounding of the main battery storage device A including the inside of the main battery storage device A, and preferably "the temperature at the main battery storage device A" means a temperature inside the main battery storage device A. The output of the main battery storage device A reaches the required output of the system by raising the temperature inside the main battery storage device A, which allows the high-efficiency operation to be performed for a long period of time A method for measuring the temperature at the main battery storage device A is described in the warm-up monitoring means.

The warm-up means may be means for warming up the main battery storage device A independently of the power generation mechanism of the battery storage device system. Alternatively, the warm-up means may be means in which the power generation mechanism of the battery storage device system is utilized from the viewpoint of saving the space and the power.

Preferably, the warm-up means is a heat exchange means for performing the heat exchange between main battery storage device A and the auxiliary battery storage device B. This is attributed to the following fact. That is, the warm-up means includes the heat exchange means for being able to perform the heat exchange between main battery storage device A and the auxiliary battery storage device B, whereby the exhaust heat generated by the operation of the main battery storage device A and/or the operation of the auxiliary battery storage device B can be utilized to raise the temperature at the main battery storage device A when the operation mode switching means selects and performs the warm-up operation mode. Accordingly, the heatup time of the main battery storage device A can be shortened while the single output of the auxiliary battery storage device B or the simultaneous outputs of the main battery storage device A are performed.

The warm-up operation mode in the operation mode switching means is described later.

The heat exchange means is not always limited to a device that exchanges the heat. For example, a shape or a disposition of the battery storage device may be used as the heat exchange means. Examples of the heat exchange means setting method include a method for disposing the main battery storage device A and the auxiliary battery storage device B in positions in which the heat exchange can be performed between the main battery storage device A and the auxiliary battery storage device B and a method for disposing the battery storage devices in a position to perfectly superpose each other, which is preferable.

When the warm-up means is used as the heat exchange means, preferably the auxiliary battery storage device B is an exothermic battery storage device.

Particularly preferably, the heat exchange means includes a flow passage through which a heat exchange medium circulates between the main battery storage device A and the auxiliary battery storage device B. This is because both the higher-safety power generation and the higher-efficiency power generation can be realized by selecting the kinds of the main battery storage device A and auxiliary battery storage device B and the heat exchange medium suitable to the temperature range in which the main battery storage device A and the auxiliary battery storage device B contribute to the power generation.

Circulating fluids such as gas and liquid can be used as the heat exchange medium. Specifically, examples of the heat exchange medium include the gas such as air, nitrogen, and argon and the liquid such as water.

In order that the heat exchange can sufficiently be performed between the main battery storage device A and the auxiliary battery storage device B, preferably the flow passage is disposed so as to surround the main battery storage device A and the auxiliary battery storage device B. When there is no trouble in the power generation, the flow passage may be designed so as to be included in the inside of the battery storage device.

Particularly preferably, circulating means such as a pump which delivers the heat exchange medium is included in order to assist the circulation of the heat exchange medium.

(4) Warm-Up Monitoring Means

The warm-up monitoring means included in the battery storage device system of the embodiment is a means for monitoring the need for the warm-up of the main battery storage device A. In order to monitor the need for the warm-up to transmit the monitored result to the operation mode switching means, it is necessary that the warm-up monitoring means include at least a means or a device that obtains physical property data from the main battery storage device A and a means for determining whether the warm-up of the main battery storage device A is required based on the obtained physical property data.

In one mode of the battery storage device system of the embodiment, the warm-up monitoring means includes a temperature measuring device that monitors a temperature at the main battery storage device A and data of operation mode switching temperature that is set to the temperature range of the predetermined temperature or more as temperature data, the temperature data becoming a criterion for determining the need for warm-up, and the warm-up monitoring means may determine that the warm-up of the main battery storage device A is required when the temperature at the main battery storage device A is lower than the operation mode switching temperature. The warm-up monitoring means has the data of operation mode switching temperature, so that the determination whether the warm-up of the main battery storage device A is required can be made from the temperature at the main battery storage device A monitored by the temperature measuring device.

As used herein, the temperature range set in the "data of operation mode switching temperature" is not always the output ability exhibition minimum temperature at the main battery storage device A. That is, the temperature range set in the data of operation mode switching temperature has a certain degree of temperature width, and the temperature range set in the data of operation mode switching temperature may be set so as not to always include the output ability exhibition minimum temperature in the temperature width.

A means for measuring the temperature at the main battery storage device A is not particularly limited, but a method for generally measuring the temperature surrounding the battery storage device can be adopted. Specifically examples of the temperature measuring method include a glass thermometer in which pure mercury is used, metallic thermometer in which bimetal is used, an electric thermometer in which platinum wire is used, a temperature sensor in which a thermocouple is used, a resistive thermometer in which a thermistor is used, and a radiation thermometer, and the like.

In one embodiment of the battery storage device system of the embodiment, the warm-up monitoring means includes an output measuring device that monitors an output at the main battery storage device A and predetermined data of operation mode switching output that is seemed to reach the temperature range of the predetermined temperature or more as output data, the output data becoming a criterion for determining the need for warm-up, and the warm-up monitoring means may determine that the warm-up of the main battery storage device A is required when the output of the main battery storage device A is lower than the operation mode switching output. The warm-up monitoring means has the data of operation mode switching temperature, so that the determination whether the warm-up of the main battery storage device A is required can be made from the output of the main battery storage device A monitored by the output measuring device.

As to the specific example of the data of operation mode switching output, the output is previously measured with respect to each temperature at the main battery storage device A, and the data is produced based on a temperature-output curve in which the output measurement result is plotted.

Preferably, the warm-up monitoring means is activated in at least the starting stage of the battery storage device system from the viewpoint of being able to monitor whether the warm-up of the main battery storage device A is required from the starting stage of the battery storage device system and to start the warm-up of the main battery storage device A when needed. For example, when the battery storage device system is used at an extremely low temperature etc., it is necessary to always confirm the need for the warm-up. In such cases, preferably the warm-up monitoring means is activated in not only the starting stage of the battery storage device system but also a halfway of the battery storage device system.

(5) Operation Mode Switching Means

The operation mode switching means included in the battery storage device system of the embodiment is a means for selecting either one of the warm-up operation mode and the normal operation mode to perform the selected operation mode.

The warm-up operation mode is an operation mode that is selected when the warm-up monitoring means determines that the warm-up of the main battery storage device A is required. In the warm-up operation mode, the warm-up of the main battery storage device A is started, and the single output of the auxiliary battery storage device B or the simultaneous outputs of the main battery storage device A and auxiliary battery storage device B are performed while the warm-up being performed. As a result of the single output of the auxiliary battery storage device B or the simultaneous outputs of the main battery storage device A and auxiliary battery storage device B, preferably the output that is equal to or more than the output requirement of the battery storage device system is obtained. The normal operation mode is an operation mode that is selected when the warm-up monitoring means determines that the warm-up of the main battery storage device A is not required.

In the normal operation mode, the warm-up of the main battery storage device A is stopped, and the single output of the main battery storage device A is performed. As a result of the single output of the main battery storage device A, preferably the output that is equal to or more than the output requirement of the battery storage device system is obtained.

As used herein, "when the warm-up monitoring means determines that the warm-up is required" is not always generated only once. That is, the warm-up monitoring means determines that the warm-up of the main battery storage device A is required, and the warm-up monitoring means determines that the warm-up of the main battery storage device A is not required after the warm-up is performed, and then the warm-up monitoring means possibly determines that the warm-up of the main battery storage device A is required once again. Even in such cases, the operation mode switching means included in the battery storage device system of the embodiment can select the warm-up operation mode again. The same holds true for "when the warm-up monitoring means determines that the warm-up is not required". That is, it is assumed that the operation mode switching means switches the operation modes by periodically obtaining the information whether the warm-up is required or not required from the warm-up monitoring means.

As used herein, the "normal operation mode" means a mode in which a normal operation is performed without performing the operation associated with the warm-up. Accordingly, in the invention, the "normal operation mode" is a mode that is selected irrespective of an anomaly even if the anomaly is generated in the whole of the battery storage device system.

In one embodiment of the battery storage device system of the embodiment, wherein the operation mode switching means has only one warm-up operation mode in which the single output of the auxiliary battery storage device B is performed while the warm-up being performed, and the operation mode switching means stops the warm-up of the main battery storage device A and switches the single output of the auxiliary battery storage device B to the single output of the main battery storage device A when the warm-up monitoring means determines that the warm-up of the main battery storage device A is not required.

In the operation mode switching means, only one warm-up operation mode in which the 100 single output is performed by the auxiliary battery storage device B is adopted, and only one warm-up operation mode in which the 100%-single output is performed by the auxiliary battery storage device B is switched to the normal operation mode in which 100%-single output is performed by the main battery storage device A during output switching.

In one embodiment of the battery storage device system of the embodiment, the warm-up monitoring means further monitors progress of the warm-up when determining that the warm-up of the main battery storage device A is required, the operation mode switching means has at least two warm-up operation modes, the warm-up operation modes differing from each other in an activating state of the main battery storage device A and/or the auxiliary battery storage device B, and the operation mode switching means selects an optimum warm-up operation mode according to the progress of the warm-up, the progress of the warm-up being determined by the warm-up monitoring means.

In the operation mode switching means, at least two warm-up operation modes are adopted. At this point, the warm-up operation modes that differ from each other in the output contribution of each of the main battery storage device A and auxiliary battery storage device B to the output of the whole of the battery storage device system can be cited as an example of "at least two warm-up operation modes". Examples of the warm-up operation modes include a warm-up operation mode of 25%-output of the main battery storage device A and 75%-output of the auxiliary battery storage device B, a warm-up operation mode of 50%-output of the main battery storage device A and 50%-output of the auxiliary battery storage device B, and a warm-up operation mode of 75%-output of the main battery storage device A and 25%-output of the auxiliary battery storage device B. That is, in the operation mode switching means, the output contribution of each of the main battery storage device A and auxiliary battery storage device B to the output of the whole of the battery storage device system can continuously be varied by selecting the optimum warm-up operation mode from the plural warm-up operation modes. Preferably the output contribution is switched so as to converge into the 100%-single output of the main battery storage device A (that is, the normal operation mode) as the system activation progresses with time.

FIG. 1 is a schematic diagram illustrating a typical example of a state in which a battery storage device system according to an embodiment of the invention is connected to an external load. FIG. 1(a) illustrates the state in which the warm-up operation mode is selected in the operation mode switching means, and FIG. 1(b) illustrates the state in which the normal operation mode is selected in the operation mode switching means. The typical example is illustrated only by way of example, and the battery storage device system of the embodiment is not limited to the typical example.

Figure 2:
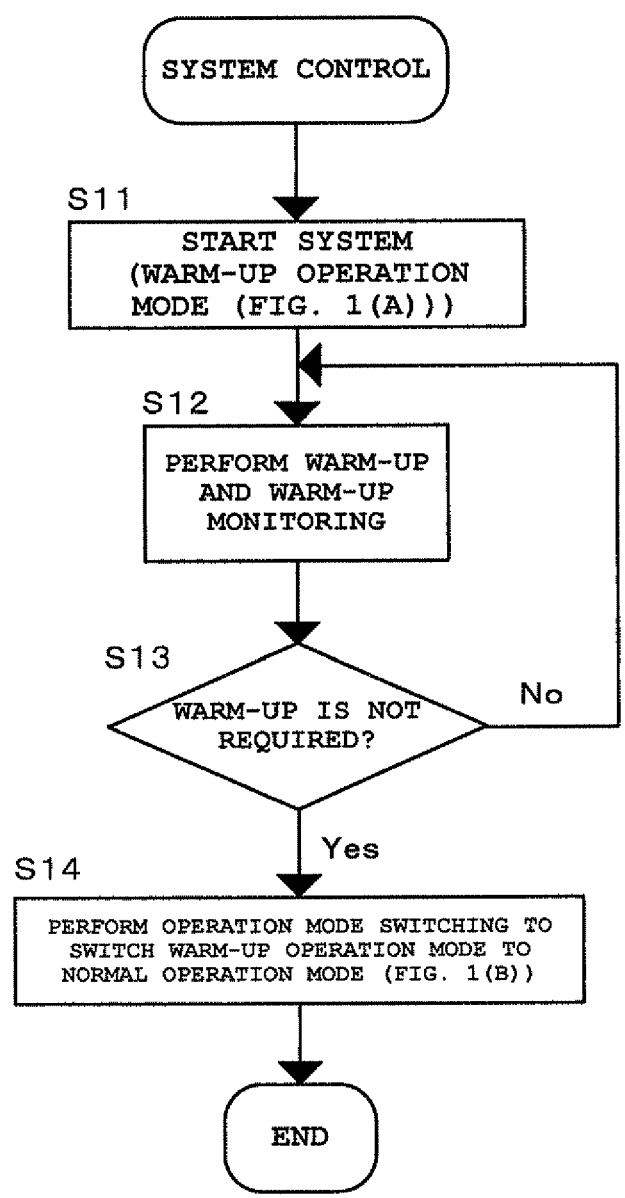
FIG. 2 is a flowchart illustrating a typical example of control of the battery storage device system of the embodiment.

FIG. 2 is a flowchart illustrating a typical example of control of the battery storage device system of the embodiment.

As illustrated in FIG. 1, the typical example of the battery storage device system of the embodiment includes the main battery storage device A and the auxiliary battery storage device B, the warm-up monitoring means including the temperature sensor that measures the temperature at the main battery storage device A, a selector switch 1 that is of one mode of the operation mode switching means, a flow passage 2 through which the heat exchange medium that is of one mode of the warm-up means is circulated, and the pump that circulates the heat exchange medium. The main battery storage device A and the auxiliary battery storage device B are connected to each other in parallel, and the main battery storage device A and the auxiliary battery storage device B are connected to the external load by the electricity supply system. The selector switch 1 is interlocked with the warm-up monitoring means, and the selector switch 1 is set such that the warm-up operation mode is automatically switched to the normal operation mode by the selector switch 1 when the warm-up monitoring means determines that the warm-up of the main battery storage device A is not required. In FIG. 1, it is assumed that the heat exchange medium (an arrow indicates a direction in which the heat exchange medium passes) passes through the flow passage 2 through the pump such that the heat exchange is sufficiently performed between the main battery storage device A and the auxiliary battery storage device B, and it is assumed that a width of the flow passage 2 and the direction in which the heat exchange medium passes are not always as illustrated.

First control of the battery storage device system of the embodiment will be described with reference to the schematic diagram of FIG. 1 and the flowchart of FIG. 2.

It is assumed that the warm-up operation mode (FIG. 1(a)) is an initial state when the system is started. In Step S11 of FIG. 2, the system is started from the state of FIG. 1(a) that is of the initial state. In Step S12, the warm-up means and the warm-up monitoring means are performed.

In Step S13, the warm-up monitoring means determines whether the warm-up is required. The warm-up monitoring means has the data of operation mode switching temperature, and the warm-up monitoring means determines whether the warm-up is required based on the data. When the warm-up is not required, the flow goes to Step S14. When the warm-up is required, the flow returns to Step S12 to continue to perform the warm-up operation mode. A time interval in which the processing in Step S13 is performed, that is, a time interval in which the warm-up monitoring means makes the determination again since the warm-up monitoring means determines that the warm-up is required is set to several seconds at the minimum and several minutes at the maximum.

In Step S14, the operation mode switching means is performed. Specifically, the selector switch 1 is switched from the warm-up operation mode of FIG. 1(a) to the normal operation mode of FIG. 1(b) to start the electricity supply performed only by the main battery storage device A, and, in the remaining operation time, the output that is equal to or more than the required output can be exhibited to supply the electric power to the external load.

A motor driving body and a moving body, in which the battery storage device system is used, will be described in order.

The motor driving body according to an embodiment of the invention includes the battery storage device system and a motor that is driven by the electric power supplied from the battery storage device system, wherein the warm-up means of the battery storage device system is a heat exchange means that performs the heat exchange between the main battery storage device A and the motor.

The motor driving body having the above-described configuration includes the heat exchange means that can perform the heat exchange between the main battery storage device A and the motor, so that the exhaust heat generated by the operation of the main battery storage device A and/or the operation of the motor can be utilized to raise the temperature at the main battery storage device A when the operation mode switching means selects and performs the warm-up operation mode. Accordingly, the heatup time of the main battery storage device A can be shortened while the single output of the auxiliary battery storage device B or the simultaneous outputs of the main battery storage device A and the auxiliary battery storage device B are performed.

Alternatively, the heat exchange means may perform the heat exchange among the main battery storage device A, the auxiliary battery storage device B, and the motor.

From the viewpoint of endurance of the long-term use, preferably the motor driving body of the embodiment further includes charging means for charging the main battery storage device A and the auxiliary battery storage device B, and a charging source of the charging means is the motor. In the motor driving body having the above-described configuration, the motor drive and the charging are simultaneously performed by the motor, so that the energy saving can be realized.

The moving body according to an embodiment of the invention includes the battery storage device system and a motor that is driven by the electric power supplied from the battery storage device system, wherein the warm-up means of the battery storage device system is a heat exchange means that performs the heat exchange between the main battery storage device A and the motor.

The moving body having the above-described configuration includes the heat exchange means that can perform the heat exchange between the main battery storage device A and the motor, so that the exhaust heat generated by the operation of the main battery storage device A and/or the operation of the motor can be utilized to raise the temperature at the main battery storage device A when the operation mode switching means selects and performs the warm-up operation mode. Accordingly, the heatup time of the main battery storage device A can be shortened while the single output of the auxiliary battery storage device B or the simultaneous outputs of the main battery storage device A and the auxiliary battery storage device B are performed.

Alternatively, the heat exchange means may perform the heat exchange among the main battery storage device A, the auxiliary battery storage device B, and the motor.

Preferably, the warm-up monitoring means of the battery storage device system includes the temperature measuring device that monitors the temperature at the main battery storage device A and data of operation mode switching temperature that is set to the temperature range exceeding the temperature range of ambient temperature to which the moving body is probably or may be subject as the temperature data, the temperature data becoming the criterion for determining the need for the warm-up, and the warm-up monitoring means determines that the warm-up of the main battery storage device A is required when the temperature at the main battery storage device A is lower than the operation mode switching temperature. This is attributed to the following fact. That is, the warm-up monitoring means has the data of operation mode switching temperature that is set to the temperature range exceeding the temperature range of the ambient temperature to which the moving body is probably or may be subject, so that the determination whether the warm-up of the main battery storage device A is required can be made from the temperature at the main battery storage device A monitored by the temperature measuring device.

From the viewpoint of endurance of the long-term use, preferably the moving body of the embodiment further includes charging means for charging the main battery storage device A and the auxiliary battery storage device B, and a charging source of the charging means is the motor. In the moving body having the above-described configuration, the motor drive and the charging are simultaneously performed by the motor, so that the energy saving can be realized.

In the moving body of the embodiment, various devices can be added according to the application. For example, devices such as an internal combustion engine, an output member that outputs the power to driving wheels of the vehicle, and a speed reducing mechanism that reduces a rotating speed of the motor can be added when the moving body of the embodiment is used as the vehicle such as the automobile.

Figure 3:
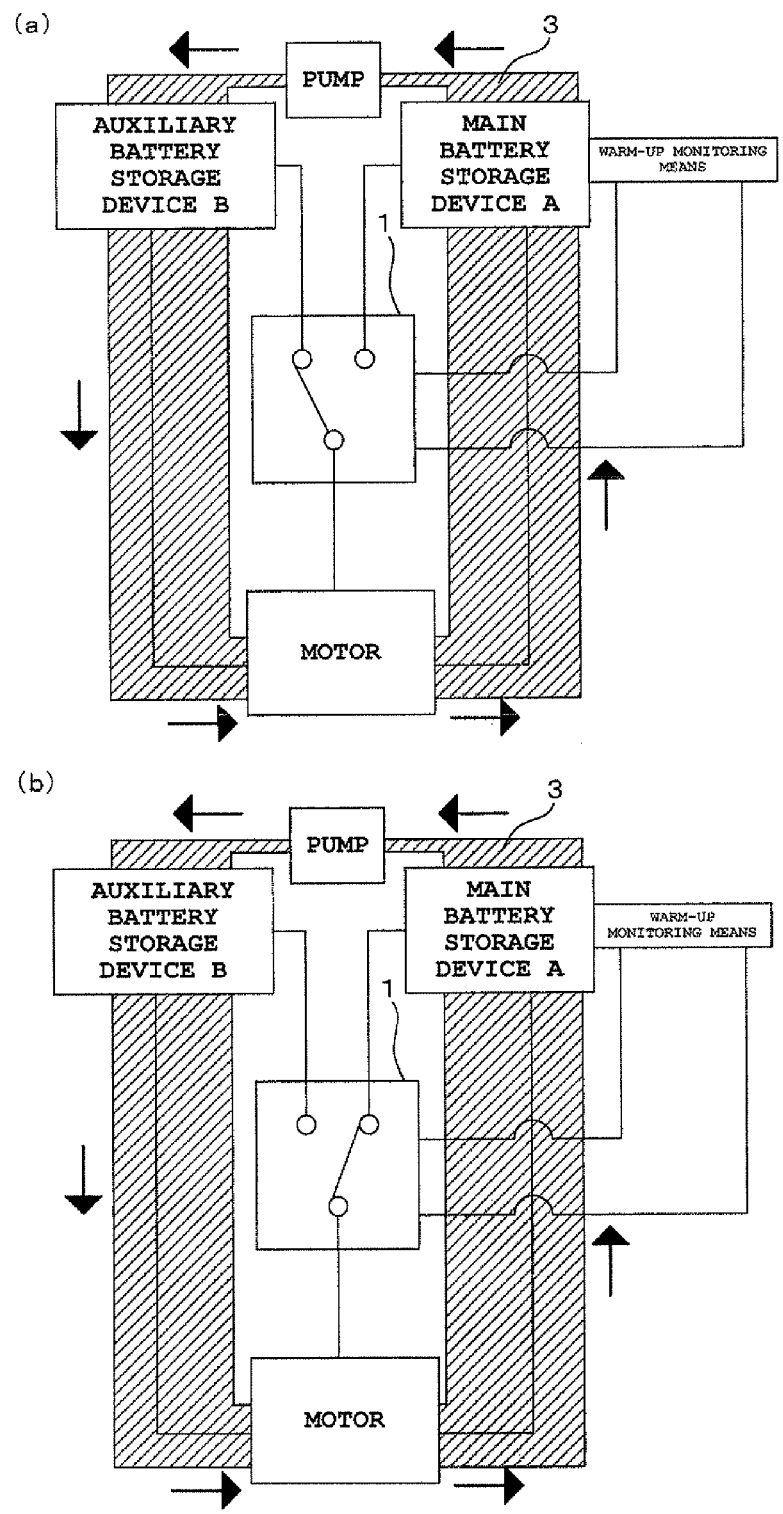
FIG. 3 is a schematic diagram illustrating a typical example of a moving body of the embodiment.

FIG. 3 is a schematic diagram illustrating a typical example of the moving body of the embodiment. FIG. 3(a) illustrates the state in which the warm-up operation mode is selected in the operation mode switching means, and FIG. 3(b) illustrates the state in which the normal operation mode is selected in the operation mode switching means. The typical example is illustrated only by way of example, and the moving body of the embodiment is not limited to the typical example.

As illustrated in FIG. 3, the typical example of the moving body of the embodiment includes the main battery storage device A and the auxiliary battery storage device B, the motor, the warm-up monitoring means including the temperature sensor that measures the temperature at the main battery storage device A, the selector switch 1 that is of one mode of the operation mode switching means, a flow passage 3 through which the heat exchange medium that is of one mode of the warm-up means is circulated, and the pump that circulates the heat exchange medium. The main battery storage device A and the auxiliary battery storage device B are connected to each other in parallel, and the main battery storage device A and the auxiliary battery storage device B are connected to the motor by the electricity supply system. The selector switch 1 is interlocked with the warm-up monitoring means, and the selector switch 1 is set such that the warm-up operation mode is automatically switched to the normal operation mode by the selector switch 1 when the warm-up monitoring means determines that the warm-up of the main battery storage device A is not required. In FIG. 3, it is assumed that the heat exchange medium (an arrow indicates a direction in which the heat exchange medium passes) passes through the flow passage 3 through the pump such that the heat exchange is sufficiently performed among the main battery storage device A, the auxiliary battery storage device B, and the motor, and it is assumed that a width of the flow passage 3 and the direction in which the heat exchange medium passes are not always as illustrated.

The control of the typical example is performed based on the flowchart of FIG. 2.

REFERENCE SIGNS LIST

1: selector switch
2 and 3: flow passage through which heat exchange medium circulates

The invention claimed is:

1. A battery storage device system that has a main battery storage device A and an auxiliary battery storage device B as power source, comprising:
  (1) the main battery storage device A that has high energy density relative to the auxiliary battery storage device B, the main battery storage device A having an output ability that is equal to or more than an output requirement necessary for the battery storage device system by a single output of the main battery storage device A in a temperature range of a predetermined temperature or more, and the output ability of the main battery storage device A being below the output requirement in a temperature range lower than the predetermined temperature;
  (2) the auxiliary battery storage device B that has high output density relative to the main battery storage device A, the auxiliary battery storage device B having the output ability that is equal to or more than the output requirement by a single output of the auxiliary battery storage device B or simultaneous outputs of the main battery storage device A and the auxiliary battery storage device B in the temperature range lower than the predetermined temperature;
  (3) a warm-up means for warming up the main battery storage device A to the predetermined temperature or more;
  (4) a warm-up monitoring means for monitoring a need for warm-up with respect to the main battery storage device A;
  (5) an operation mode switching means for selecting an operation mode from a warm-up operation mode and a normal operation mode and performing the selected operation mode, wherein the warm-up operation mode starts warm-up of the main battery storage device A and the single output of the auxiliary battery storage device B or the simultaneous outputs of the main battery storage device A and the auxiliary battery storage device B are performed while the warm-up being performed when the warm-up monitoring means determines that the warm-up of the main battery storage device A is required, and the normal operation mode stops the warm-up of the main battery storage device A and the single output of the main battery storage device A is performed when the warm-up monitoring means determines that the warm-up of the main battery storage device A is not required; and (6) an electricity supply system for supplying an electric power to an outside of the battery storage device system, the electric power being obtained by the single output of the auxiliary battery storage device B or the simultaneous outputs of the main battery storage device A and the auxiliary battery storage device B in the warm-up operation mode, or obtained by the single output of the main battery storage device A in the normal operation mode.

2. The battery storage device system according to claim 1, wherein the warm-up means is a heat exchange means for performing heat exchange between the main battery storage device A and the auxiliary battery storage device B.

3. The battery storage device system according to claim 1, wherein the warm-up monitoring means includes a temperature measuring device that monitors a temperature at the main battery storage device A and data of operation mode switching temperature that is set to the temperature range of the predetermined temperature or more as temperature data, the temperature data becoming a criterion for determining the need for warm-up, and the warm-up monitoring means determines that the warm-up of the main battery storage device A is required when the temperature at the main battery storage device A is lower than the operation mode switching temperature.

4. The battery storage device system according to claim 1, wherein the warm-up monitoring means includes an output measuring device that monitors an output at the main battery storage device A and predetermined data of operation mode switching output that is seemed to reach the temperature range of the predetermined temperature or more as output data, the output data becoming a criterion for determining the need for warm-up, and the warm-up monitoring means determines that the warm-up of the main battery storage device A is required when the output of the main battery storage device A is lower than the operation mode switching output.

5. The battery storage device system according to claim 1, wherein the warm-up monitoring means is activated in at least a starting stage of the battery storage device system.

6. The battery storage device system according to claim 1, wherein the operation mode switching means has only one warm-up operation mode in which the single output of the auxiliary battery storage device B is performed while the warm-up being performed, and the operation mode switching means stops the warm-up of the main battery storage device A and switches the single output of the auxiliary battery storage device B to the single output of the main battery storage device A when the warm-up monitoring means determines that the warm-up of the main battery storage device A is not required.

7. The battery storage device system according to claim 1, wherein the warm-up monitoring means further monitors progress of the warm-up when determining that the warm-up of the main battery storage device A is required, the operation mode switching means has at least two warm-up operation modes, the warm-up operation modes differing from each other in an activating state of the main battery storage device A and/or the auxiliary battery storage device B, and the operation mode switching means selects an optimum warm-up operation mode according to the progress of the warm-up, the progress of the warm-up being determined by the warm-up monitoring means.

8. The battery storage device system according to claim 1, wherein the main battery storage device A is a solid electrolyte secondary battery.

9. The battery storage device system according to claim 8, wherein the auxiliary battery storage device B is a solid electrolyte secondary battery.

10. The battery storage device system according to claim 8, wherein the auxiliary battery storage device B is a lithium-ion secondary battery.

11. The battery storage device system according to claim 1, further comprising charging means for charging the main battery storage device A and the auxiliary battery storage device B.

12. A motor driving body comprising:
the battery storage device system defined in claim 1; and
a motor that is driven by an electric power supplied from the battery storage device system,
wherein the warm-up means of the battery storage device system is a heat exchange means for performing heat exchange between the main battery storage device A and the motor.

13. The motor driving body according to claim 12, further comprising charging means for charging the main battery storage device A and the auxiliary battery storage device B,
wherein a charging source of the charging means is the motor.

14. A moving body comprising:
the battery storage device system defined in claim 1; and
a motor that is driven by an electric power supplied from the battery storage device system,
wherein the warm-up means of the battery storage device system is a heat exchange means for performing heat exchange between the main battery storage device A and the motor.

15. The moving body according to claim 14, wherein the warm-up monitoring means of the battery storage device system includes a temperature measuring device that monitors a temperature at the main battery storage device A and data of operation mode switching temperature that is set to a temperature range exceeding a temperature range of ambient temperature to which the moving body is probably subject as temperature data, the temperature date becoming a criterion for determining a need for warm-up, and the warm-up monitoring means determines that the warm-up of the main battery storage device A is required when the temperature at the main battery storage device A is lower than the operation mode switching temperature.

16. The moving body according to claim 14, further comprising charging means for charging the main battery storage device A and the auxiliary battery storage device B,
wherein a charging source of the charging means is the motor.

* * * * *